(12) United States Patent
Gerasopoulos et al.

(10) Patent No.: US 12,456,748 B2
(45) Date of Patent: Oct. 28, 2025

(54) TEXTILE AND FIBER ENERGY STORAGE AND POWER-GENERATING DEVICES

(71) Applicant: The Johns Hopkins University, Baltimore, MD (US)

(72) Inventors: Konstantinos Gerasopoulos, Highland, MD (US); Michael H. Jin, Ellicott City, MD (US); Spencer A. Langevin, Columbia, MD (US); Adam W. Freeman, Laurel, MD (US); Evan D. Jacque, Columbia, MD (US); Nathan J. Fairbanks, Montgomery Village, MD (US); Luke J. Currano, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 847 days.

(21) Appl. No.: 17/665,954

(22) Filed: Feb. 7, 2022

(65) Prior Publication Data

US 2022/0255109 A1 Aug. 11, 2022

Related U.S. Application Data

(60) Provisional application No. 63/146,861, filed on Feb. 8, 2021.

(51) Int. Cl.
*H01M 10/04* (2006.01)
*H01M 4/131* (2010.01)
(Continued)

(52) U.S. Cl.
CPC ........... *H01M 10/04* (2013.01); *H01M 4/131* (2013.01); *H01M 4/625* (2013.01); *H01M 4/663* (2013.01);
(Continued)

(58) Field of Classification Search
USPC ................ 320/101, 102, 103, 104, 105, 106
See application file for complete search history.

(56) References Cited

U.S. PATENT DOCUMENTS

2016/0028111 A1 1/2016 Ahn et al.
2019/0123385 A1 4/2019 Schmitz
(Continued)

FOREIGN PATENT DOCUMENTS

CN 111918908 A * 11/2020 ............. B32B 15/08
TW 201721373 A * 6/2017 ......... G06F 3/03545

OTHER PUBLICATIONS

Pengcheng Shi et al., "A highly concentrated phosphate-based electrolyte for high-safety rechargeable lithium batteries," Chem. Commun., 2018, 54, pp. 4453-4456.
(Continued)

*Primary Examiner* — Brian Ngo
(74) *Attorney, Agent, or Firm* — Todd R. Farnsworth

(57) ABSTRACT

A layered textile energy storage device can include first and second encasing layers, an anode, a cathode, and a flexible separator layer. The first and second encasing layers can each include a nylon fabric coated with a polyurethane. The anode can include a carbon fabric coated with anode active material, carbon nanotubes, and a binder material. The cathode can include a carbon fabric coated with cathode active material, carbon nanotubes, and a binder material. The flexible separator layer can be disposed between the anode and cathode to prevent internal shorting of the layered textile energy storage device. The anode, the cathode and the flexible separator layer can be disposed between the first and the second encasing layers.

21 Claims, 5 Drawing Sheets

(51) Int. Cl.

| | |
|---|---|
| *H01M 4/62* | (2006.01) |
| *H01M 4/66* | (2006.01) |
| *H01M 10/0565* | (2010.01) |
| *H01M 50/141* | (2021.01) |
| *H01M 50/145* | (2021.01) |
| *H02S 40/38* | (2014.01) |
| *H01M 4/02* | (2006.01) |

(52) U.S. Cl.
CPC ..... *H01M 10/0565* (2013.01); *H01M 50/141* (2021.01); *H01M 50/145* (2021.01); *H02S 40/38* (2014.12); *H01M 2004/021* (2013.01)

(56) References Cited

U.S. PATENT DOCUMENTS

| | | | |
|---|---|---|---|
| 2019/0123391 A1 | 4/2019 | Mizutani et al. | |
| 2019/0393541 A1* | 12/2019 | Jang | H01M 10/0565 |
| 2020/0274148 A1 | 8/2020 | Xiao et al. | |

OTHER PUBLICATIONS

Yang Dong et al., "Fire-Retardant Phosphate-Based Electrolytes for High-Performance Lithium Metal Batteries," ACS Appl. Energy Mater., 2019, 2, pp. 2708-2716.

Hieu Quang Pham et al., "Non-flammable organic liquid electrolyte for high-safety and high-energy density Li-ion batteries," Journal of Power Sources 404, 2018, pp. 13-19.

Qingson Wang et al., "Progress of enhancing the safety of lithium ion battery from the electrolyte aspect," Nano Energy 55, 2019, pp. 93-114.

Lei Zhang et al., "Flame-Retardant Electrolyte Solution for Dual-Ion Batteries," ACS Appl. Energy Mater., 2019, 2, pp. 1363-1370.

Neha Chawla et al., "Recent Advances in Non-Flammable Electrolytes for Safer Lithium-Ion Batteries," Batteries 2019, 5, 19, pp. 1-25.

Toru Yamaguchi et al., "Simulations of dielectric constants and viscosities of organic electrolytes by quantum mechanics and molecular dynamics," Journal of Molecular Liquids 312, 2020, 113288, pp. 1-9.

Lizhen Long et al., "Polymer electrolytes for lithium polymer batteries," J. Mater. Chem. A, 2016, 4, pp. 10038-10069.

Shi Tan et al., "Recent Progress in Research on High-Voltage Electrolytes for Lithium-Ion Batteries," ChemPhysChem, 2014, 15, pp. 1956-1969.

Reza Younesi et al., "Lithium salts for advanced lithium batteries: Li-metal, Li—O2, and Li—S," Energy Environ. Sci., 2015, 8, pp. 1905-1922.

Cleber F. N. Marchiori et al., "Understanding the Electrochemical Stability Window of Polymer Electrolytes in Solid-State Batteries from Atomic-Scale Modeling: The Role of Li-Ion Salts," Chem. Mater. 2020, 32, pp. 7237-7246.

Flex Seal Liquid, last accessed Jan. 25, 2022, 3 pages, available at: https://flexsealproducts.com/products/flex-seal-liquid?variant=32929853735021.

Plasti Dip, multipurpose rubber coating, last accessed Jan. 25, 2022, 5 pages, available at: https://plastidip.com/our-products/plasti-dip/.

Solar Panels Based on Maxeon Solar Cell Technology | Sunpower, last accessed Feb. 4, 2022, 7 pages, available at: https://us.sunpower.com/why-sunpower/maxeon-solar-cells.

Ceracharge | TDK Electronics—TDK Europe, last accessed Feb. 7, 2022, 7 pages, available at: https://www.tdk-electronics.tdk.com/en/ceracharge.

* cited by examiner

TEXTILE AND FIBER ENERGY STORAGE AND POWER-GENERATING DEVICES

CROSS REFERENCE TO RELATED APPLICATIONS

This application claims benefit to U.S. Provisional Patent Application No. 63/146,861, filed Feb. 8, 2021, which is incorporated by reference herein in its entirety.

BACKGROUND

Field

The present disclosure relates to portable electrical devices, for example, textile and fiber-based batteries and photovoltaic devices for wearable electronics.

Background

Portable electronic devices are now ubiquitous owing to advancements in scalable electronics. There are now emerging markets for wearable electronics. An obstacle to electronic portability is the size of electrical power sources compared to the devices they are intended to power. Most portable devices require relatively large power sources. For example, the batteries used in laptops, smartphones, and tablets comprise a large portion of the weight and volume of their host device. Similarly, limitations in power source miniaturization is an obstacle to the widespread adoption of wearable electronics.

SUMMARY

Accordingly, it is desirable to improve technologies for energy storage and power generation for providing high capacity storage and high power generation using light-weight devices with convenient form factor.

In some embodiments, a layered textile energy storage device can include first and second encasing layers, an anode, a cathode, and a flexible separator layer. The first and second encasing layers can each include a nylon fabric coated with a polyurethane. The anode can include a carbon fabric coated with anode active material, carbon nanotubes, and a binder material. The cathode can include a carbon fabric coated with cathode active material, carbon nanotubes, and a binder material. The flexible separator layer can be disposed between the anode and cathode to prevent internal shorting of the layered textile energy storage device. The anode, the cathode and the flexible separator layer can be disposed between the first and the second encasing layers.

In some embodiments, an energy storage fiber can include a flexible fiber film. The flexible fiber film can include a printed circuit on a polyimide substrate, a plurality of micro energy storage devices, encapsulation material, and electrical terminals. The plurality of micro energy storage devices can be electrically connected to the printed circuit. The polyimide substrate, printed circuit, and plurality of micro energy storage devices can be encapsulated by the encapsulation material. The electrical terminals can be electrically coupled to the printed circuit to allow electrical connectivity to the plurality of micro energy storage devices.

In some embodiments, an energy storage fiber can include a flexible fiber film. The flexible fiber film can include a printed circuit on a polyimide substrate, a plurality of photovoltaic cells, encapsulation material, and electrical terminals. The plurality of photovoltaic cells can be electrically connected to the printed circuit. The polyimide substrate, printed circuit, and plurality of photovoltaic cells can be encapsulated by the encapsulation material. The electrical terminals can be electrically coupled to the printed circuit to allow electrical connectivity to the plurality of photovoltaic cells.

Further features of the present disclosure, as well as the structure and operation of various embodiments, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present disclosure and, together with the description, further serve to explain the principles of the present disclosure and to enable a person skilled in the relevant art(s) to make and use embodiments described herein.

Figure 1:
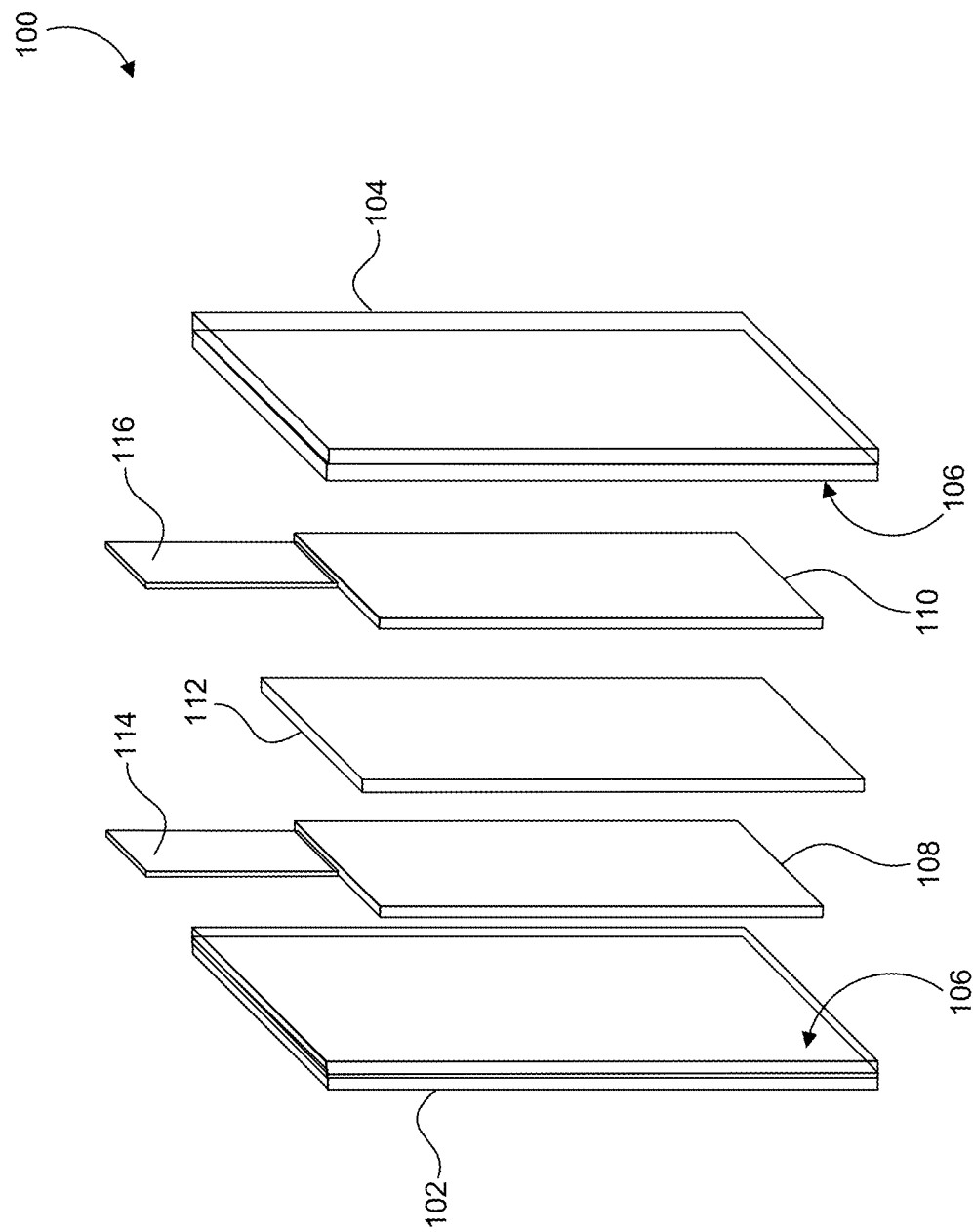
FIG. 1 shows an energy storage device, according to some embodiments.

The features of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

This specification discloses one or more embodiments that incorporate the features of the present disclosure. The disclosed embodiment(s) are provided as examples. The scope of the present disclosure is not limited to the disclosed embodiment(s). Claimed features are defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Spatially relative terms, such as "beneath," "below," "lower," "above," "on," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The term "about," "approximately," or the like may be used herein to indicate a value of a quantity that may vary or be found to be within a range of values, based on a particular technology. Based on the particular technology, the terms may indicate a value of a given quantity that is within, for example, 1-20% of the value (e.g., ±1%, ±5% ±10%, ±15%, or ±20% of the value).

Embodiments of the present disclosure are directed to structurally pliable energy storage devices (e.g., batteries) and power generation devices (e.g., photovoltaic cells). Embodiments described herein may be used to reduce cost, size, and/or complexity of construction of the energy storage and power generation devices while enhancing modularity, customizability, and performance, as well as overcoming limitations of conventional power devices.

FIG. 1 shows an exploded view of an energy storage device 100, according to some embodiments. In some embodiments, energy storage device 100 can be a layered-textile energy storage device. The layered-textile property can allow energy storage device 100 to be flexible and stretchable, for example, like a clothing fabric. Energy storage device 100 can comprise encasing layers 102 and 104 (e.g., first and second encasing layers), an anode 108, a cathode 110, and a flexible separator layer 112.

In some embodiments, encasing layers 102 and 104 can each comprise a nylon fabric coated with polyurethane material 106 (e.g., thermoplastic polyurethane). Anode 108 can comprise a carbon fabric coated with anode active material (e.g., lithium titanium oxide (LTO), other lithium-based active materials, zinc-based active materials, graphite-based active materials, or the like), carbon nanotubes (CNTs), and a binder material. The binder material can give structural stability to the coating materials on the carbon fabric. Cathode 110 can comprise a carbon fabric coated with cathode active material (e.g., lithium cobalt oxide (LCO), other lithium-based active materials, zinc-based active materials, graphite-based active materials, or the like), carbon nanotubes (CNTs), and a binder material. The binder material of cathode 110 can be the same or approximately the same as the binder material of anode 108. The binder material can comprise, for example, polyvinylidene fluoride material.

In some embodiments, flexible separator layer 112 can be a cellulose separator, a ceramic-coated polyethylene (PE), or the like. Flexible separator layer 112 can be disposed between anode 108 and cathode 110 to prevent internal electrical shorting in energy storage device 100. Flexible separator layer 112, anode 108, and cathode 110 can be disposed between encasing layers 102 and 104. Encasing layers 102 and 104 can protect the internals of energy storage device 100 while also being flexible and stretchable enough to allow energy storage device 100 to exhibit textile-like properties.

In some embodiments, the interior of energy storage device may include additional material to facilitate flow of electrical current according to techniques known to those skilled in the art. For example, the interior of energy storage device 100 can be filled with an electrolyte. Due to the nature of the exploded view of FIG. 1, the electrolyte is not shown, but can be understood to surround anode 108, cathode 110, and flexible separator layer 112.

In some embodiments, the electrolyte can have a gel or solid composition. The electrolyte can be a polymer electrolyte. The gel polymer electrolyte can enhance the structural stability of the inner contents of energy storage device 100 (e.g., prevent substances from running). The gel polymer electrolyte can comprise a mixture of a liquid precursor, a thermal initiator, and a polymer precursor. The liquid precursor can include a mixture of one or more aqueous or organic solvents and one or more lithium-based salts. The polymer precursor can include a mixture of one or more crosslinkers. The polymer precursor can include a mixture of one or more monomers and one or more crosslinkers. Other examples of electrolyte implementations can be found in U.S. application Ser. No. 17/583,881 filed on Jan. 25, 2022, which is incorporated by reference herein in its entirety.

In some embodiments, energy storage device 100 can be scalable. Energy storage device 100 can span a contiguous area that is tens, hundreds, or thousands of centimeters squared. For example, energy storage device 100 can be palm-sized. An energy storage system can comprise a plurality of storage devices 100 connected in parallel, in series, or a combination of both. In this manner, storage capacity and potential difference can be adjusted to desired values.

In some embodiments, after the coatings are applied to anode 108 and cathode 110, anode 108, cathode 110, flexible separator 112, and encasing layers 102 and 104 can be assembled according to the layer ordering shown in FIG. 1. Anode 108 can comprise a tab terminal 114. Cathode 110 can comprise a tab terminal 116. Tab terminals 114 and 116 allow external electrical devices to connect to energy storage device 100 in order to draw power.

In some embodiments, energy storage device 100 can be affixed onto garments, handbags, backpacks, or other fabric-based objects (e.g., sown on, glued on, or the like). Energy storage device 100 can be ruggedized and applied to outdoor gear, space suits, industrial protective gear, or the like. Energy storage device 100 can provide power to wearable electronics as well as other personally portable electronics.

In some embodiments, energy storage device 100 can be fabricated in the following manner. To prepare for coating materials, the carbon fabric for anode 108 and/or collector 110 can be affixed to a flat surface. A liquid mixture of active material (i.e., LTO or LCO), CNTs, and binder material may be prepared for the coating procedure. For example, a composition of LTO, CNTs, and polyvinylidene fluoride may be suspended in a liquid. The coating composition can comprise 4% or more of CNTs and 6% or more of binder material. For example, the composition of active material, CNTs, and binder can have a ratio of 90:4:6. The above-noted composition quantities are provided as non-limiting examples. Other composition ratios are envisaged. For example, the coating composition can comprise 1-10% CNTs and 1-20% binder material. If the active materials and CNTs do not adhere well to the carbon fabric after drying, then binder material content can be increased. The active material and CNT quantities can be adjusted to achieve a target electrical performance.

In some embodiments, the coating thickness of the coating composition can be adjusted to achieve a given electrical performance. For example, a thickness of 500 µm, 800 µm, 1 mm or 2 mm can be used when the coating composition is applied to the carbon fabric. The thickness of the coating can be in the ranges of approximately 500 µm to 2 mm, 800 µm to 1.5 mm, 0.5 millimeters or less, 1 millimeter or less, or the like. Composition content and coating thickness can be adjusted such that a storage capacity of energy storage device 100 per area of fabric is, for example, 2.5 mAh/cm$^2$. Other electrical performance values are envisaged, for example, storage capacities in the range of approximately 1-10 mAh/cm$^2$, 2-5 mAh/cm$^2$, or the like. After application of the coating, the carbon fabric can be dried. The dried coating may cause the carbon fabric to become stiff. Therefore, after drying, the carbon fabric may be further processed to reinstate some flexibility, according to techniques known to persons skilled in the textile arts. For example, the carbon fabric may be pressed between two cylindrical rollers (e.g., calendaring).

In some embodiments, energy storage device 100 can be designed as a pouch cell. A coating of polyurethane material 106 can be applied to encasing layers 102 and 104. Anode 108, flexible separator 112, and cathode 110 can then be layered onto encasing layer 102 as shown in FIG. 1. With the area of encasing layer 102 being larger than an area of the carbon fabrics and flexible separator, double-sided adhesive polyurethane can be applied to the perimeter of encasing layer 102. The double-sided adhesive polyurethane is for affixing encasing layers 102 and 104 at the edge(s) while leaving a portion of the edge(s) open to form the pouch shape. The pouch is not limited to the rectangular shape shown in FIG. 1. Other shapes and affixing techniques may be used.

In some embodiments, a piece of wax paper, or the like, may be used to temporarily prevent sealing the pouch before intended. The pouch cell may be dried to remove excess water (e.g., oven-dried). The pouch can be filled with an electrolyte (e.g., a gel polymer electrolyte). In the case of a gel polymer electrolyte, the mixture can comprise a solvent, a polymer, a crosslinker, a thermal initiator, and the like. The electrolyte mixture can be left alone for a period of time to allow it to infiltrate the contents of the pouch (e.g., four hours or more). To form the gel state of the electrolyte, the pouch can then be cured (e.g., in an oven). The curing conditions can be, for example, 80° C. for 3 hours or more. With structural stability secured, the electrical performance of energy storage device 100 can be tested. The testing can be performed at a given C rate. Those skilled in the art will appreciate a battery "C rate" or "C rating" relates to a battery's charge and discharge rates when assessing the battery's capacity. As a non-limiting example, C/10 can refer to a discharge test that spans 10 hours. Other C rates can be used for testing energy storage devices disclosed herein.

In some embodiments, tab terminals 114 and 116 can be an extension of the carbon fabrics of anode 108 and cathode 110. For enhanced electrical contact, tab terminals 114 and 116 can be constructed with aluminum tabs, a drawback being the potential of reduced visual appeal.

Figure 2:
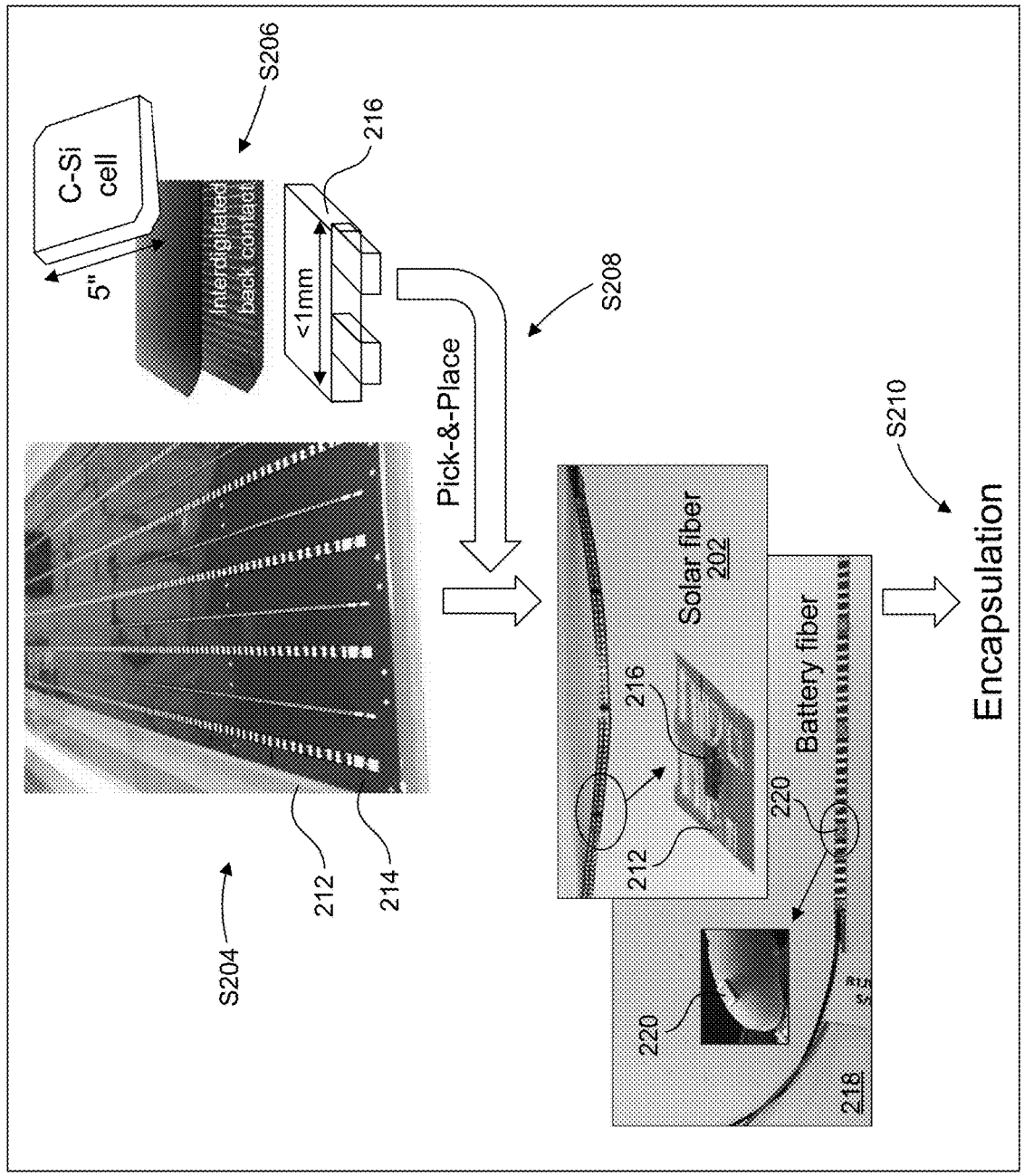
FIG. 2 shows a flow diagram for fabricating a power-generating fiber and an energy storage fiber, according to some embodiments.

FIG. 2 shows a flow diagram for fabricating a power-generating fiber 202, according to some embodiments. In some embodiments, power-generating fiber 202 can be a solar fiber that uses photovoltaic cells to generate electrical power. At step S204, a printed circuit 214 can be fabricated on a metal-coated polyimide substrate 212. Polyimide substrate 212 can be, for example, a film of poly (4,4'-oxydiphenylene-pyromellitimide). Printed circuit 214 can be fabricated using a circuit printing technique (e.g., photolithography, machined, laser-machined, or the like). Printed circuit 214 can be fabricated with regions for receiving miniature photovoltaic cells 216.

In some embodiments, printed circuit 214 and polyimide substrate 212 can be separated (e.g., cut) into fiber strands, producing flexible fiber films. The cutting can be performed before or after assembly with photovoltaic components. It should be appreciated that power-generating fiber 202 is not limited to polyimide substrates. Other substrate materials can be used. The choice of substrate material can depend on the rigors of fabrication, for example, chemical stability in a corrosive bath, structural stability when heated, optical absorption (e.g., when illuminated by a laser), or the like. In the non-limiting example presented in FIG. 2, it is shown that polyimide substrate 212 can have a length of 18" and a width of a few inches (e.g., according to COTS availability) before being separated into individual fibers.

In some embodiments, at step S206, photovoltaic cells 216 can be provided. The size of photovoltaic cells 216 can be adjusted according to target dimensions for power-generating fiber 202. For example, if a strand of power-generating fiber 202 is to remain in the order of millimeters, then photovoltaic cells 216 can have a length and/or width of approximately 3 millimeter or less, 2 millimeter or less, or 1 millimeter or less. Photovoltaic cells 216 can be diced from a larger photovoltaic cell (e.g., a 5"×5" Si photovoltaic cell). Large photovoltaic cells can be COTS components (e.g., Maxeon™ solar cell from SunPower). Custom-made photovoltaic cells can also be used. Photovoltaic cells 216 can be at least somewhat flexible (e.g., ultra-thin silicon). The flexibility can reduce the risk of damaging power-generating device 202. Photovoltaic cells 216 can be made of materials other than silicon capable of converting sunlight to electrical power (e.g., gallium arsenide).

In some embodiments, at step S208, photovoltaic cells 216 can be disposed and affixed on printed circuit 214. Photovoltaic cells 216 can be arranged in parallel, in series, or a combination of both. To achieve this, the fabrication of printed circuit 214 can be adjusted at step S204 according to the desired arrangement for photovoltaic cells 216. The adjusting of the arrangement allows adjustment to the voltage and/or current provided by power-generating fiber 202.

In some embodiments, at step S210, power-generating device 202 can be encapsulated using encapsulation material. The encapsulation material can be flexible to allow power-generating device 202 to be shaped according to specifications of a desired product (e.g., to wrap around a person's wrist or abdomen). The encapsulation material can be transparent to at least a portion of the sunlight spectrum so as to allow photons of the transmitted wavelengths to reach photovoltaic cells 216. The encapsulation material can have a given refractive index to provide index-matching of the air-to-cell interface (i.e., more photons reach the photovoltaic cells). Encapsulation materials can comprise heat shrink tubing, dip coating, spray coating, hot melt extrusion, or the like. Other features of the encapsulation material can include ease of application on imbedded devices, conformal to imbedded features (such as miniature photovoltaic cells and batteries), protection against $H_2O$ and $O_2$, or the like. Other examples of encapsulation materials can include polyolefin, PVC, fluoropolymers, or the like. Connection terminals can be provided through the encapsulation material so as to allow electrical connection to printed circuit 214 and the electronics in power-generating fiber 202.

In some embodiments, the fabrication processes described above for power-generating fiber 202 can also apply to fabrication of an energy storage fiber 218 (e.g., a battery fiber). A difference between power-generating fiber 202 and energy storage fiber 218 is that energy storage fiber 218 uses micro energy storage devices 220 instead of photovoltaic cells 216. Micro energy storage devices 220 can be available COTS (e.g. CeraCharge from TDK). Custom-made micro energy storage devices 220 can also be used. Micro energy storage devices 220 can have a length and/or width of approximately 3 millimeter or less, 2 millimeter or less, or 1 millimeter or less. In some embodiments, photovoltaic cells 216 and micro energy storage devices 220 can be combined in a fiber device so as to provide both power generation and energy storage. Since the construction of micro energy storage devices 220 is a volume device (as opposed to a flat energy storage device), micro energy storage devices 220 can have storage efficiencies of approximately 90% or greater.

Figure 3:
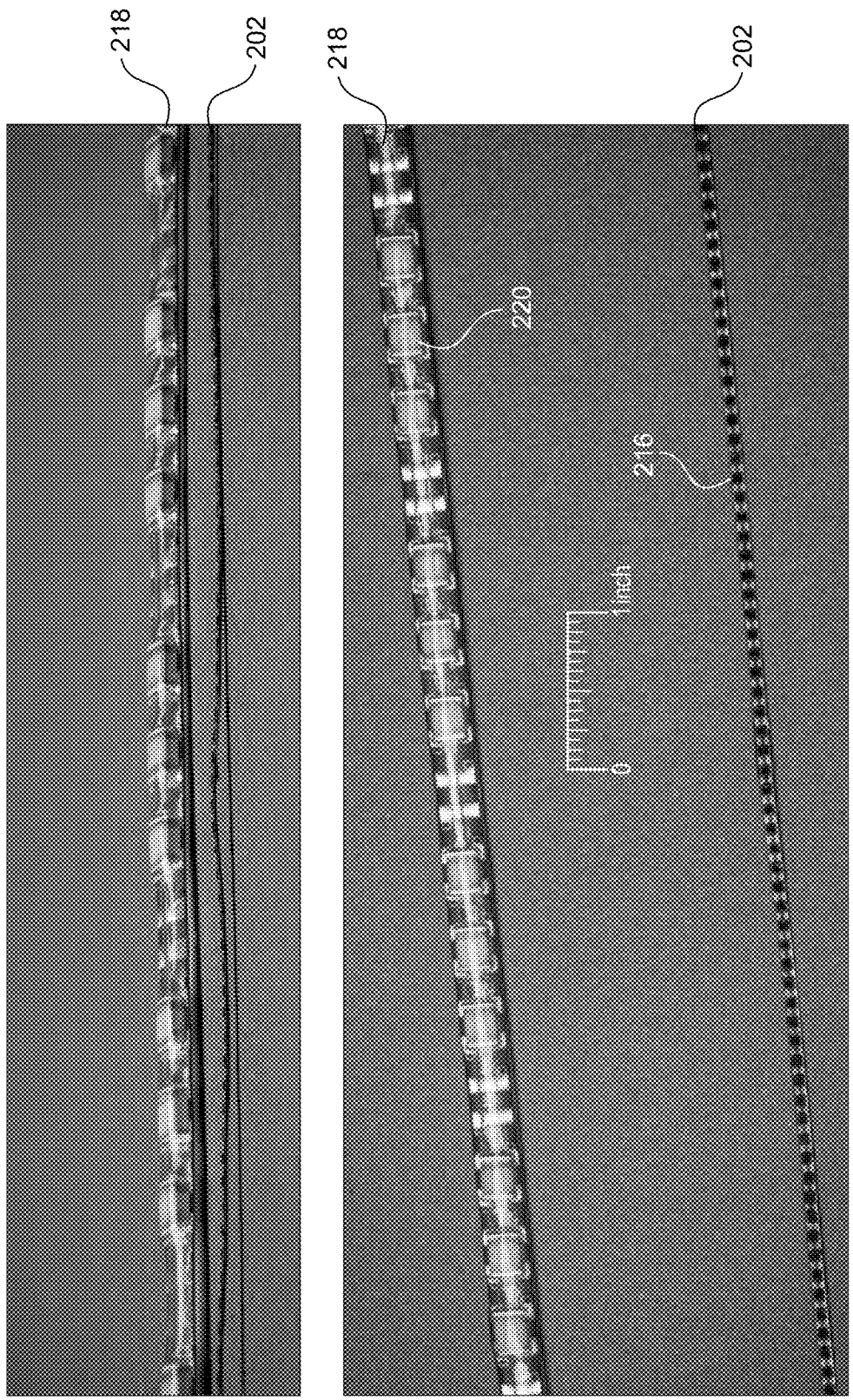
FIG. 3 shows a power-generating fiber and an energy storage fiber, according to some embodiments.

FIG. 3 shows an exemplary close-up of a power-generating fiber 202 and an energy storage fiber 218. In some embodiments, power-generating fiber 202 can be fabricated so as to be compact. The compactness can allow power-generating fiber 202 to be convenient for implementation in general apparel (e.g., outer garments, gloves, or the like), bags, or other personal items that may be regularly exposed to the exterior of one's person (e.g., to receive sunlight). Other example implementations can also include tarps, tent-like enclosures/coverings, or the like. Power-generating fiber 202 and energy storage fiber 218 can be affixed on an object (e.g., weaved into fabric, sown on, glued on, or the like). A width of power-generating fiber 202 can be approximately 3 mm or less, 2 mm or less, 1.5 mm or less, 800 μm or less, or 500 μm or less. Similarly, a width of energy storage fiber 218 can be approximately 5 mm or less, 3 mm or less, or 2 mm or less. In some embodiments, the above-mentioned example implementations (e.g., apparel, carry-on items, tents, or the like), can generally extend to textile and fiber-based energy storage devices and power-generating devices.

In some embodiments, the performance of devices disclosed herein can be tested by measuring electrical output using constant current and/or constant voltage techniques. Other measurements can also be performed, such as tracking the evolution of chemical composition.

Figure 4:
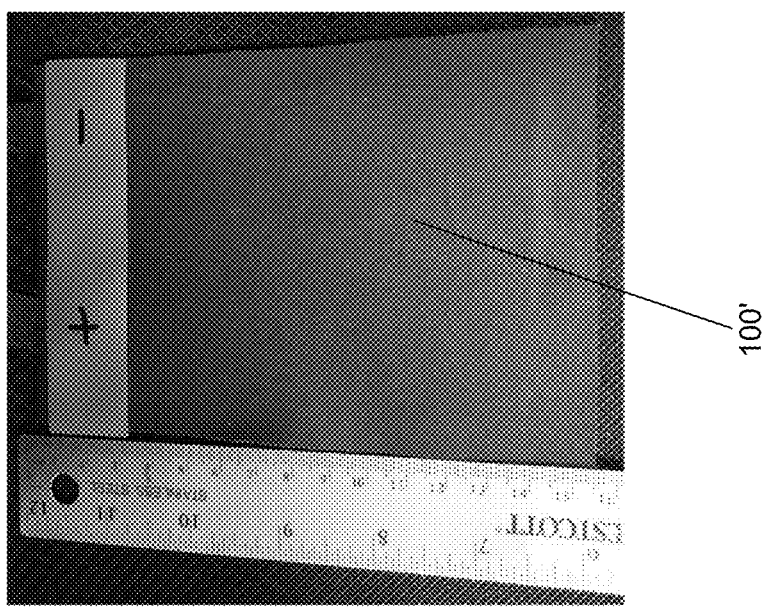
FIG. 4 shows a plot of measurement data for an energy storage device, according to some embodiments.
Figure 4:
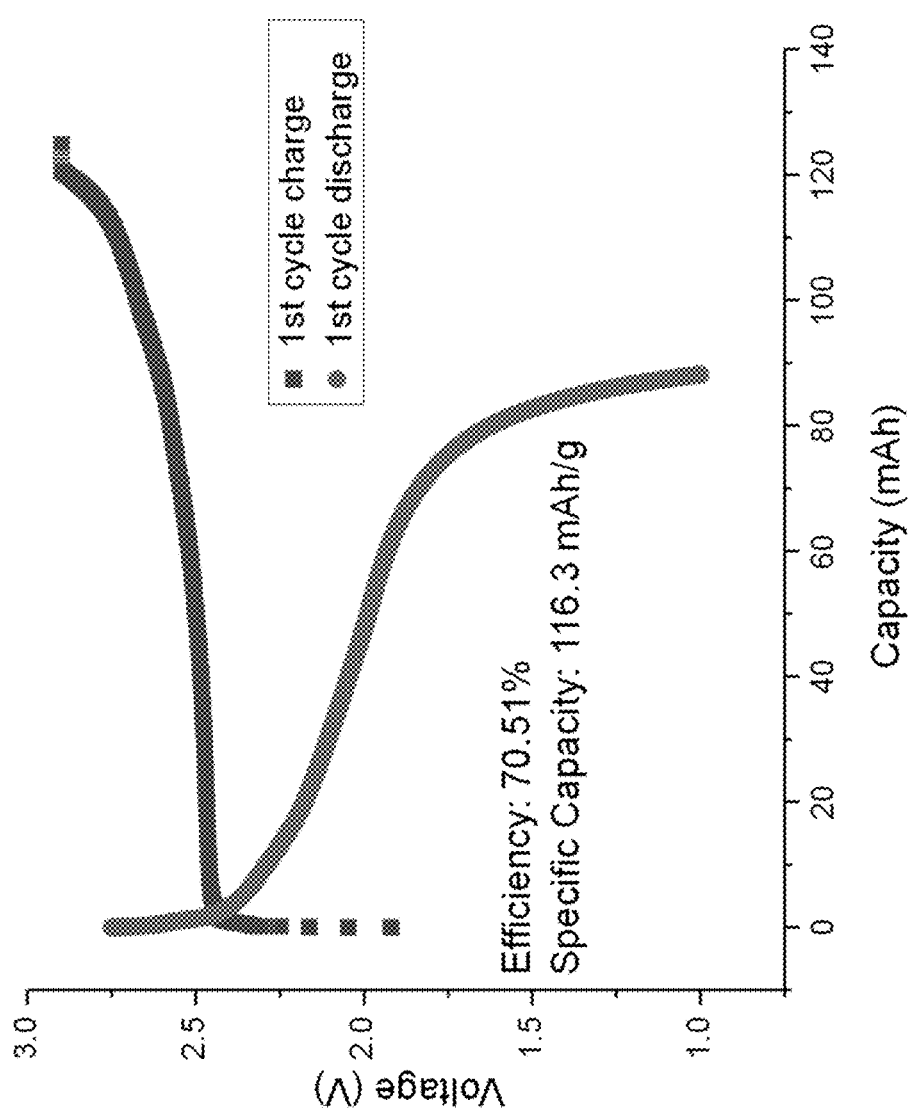

FIG. 4 shows a plot of actual measurement data for an energy storage device 100', according to some embodiments. Energy storage device 100' is an actual fabrication example of energy storage device 100 (FIG. 1). The measurement was performed by charging the energy storage device under constant current and constant voltage conditions and discharging the energy storage device under constant current conditions. The fabrication techniques described herein allow for the production of a textile battery that can achieve a desired storage capacity that is verifiable via electrical measurements (e.g., 2.5 mAh/cm$^2$). One performance parameter may be the amount of storage capacity per unit weight of the anode active material (e.g., 120 mAh/g). Based on the fabrication method described above, energy storage device 100 can exhibit, for example, a storage capacity of approximately 60-120 mAh/g, 80-100 mAh/g, or the like.

In some embodiments, energy storage device 100' can exhibit, for example, a storage efficiency of approximately 70%. Storage efficiency (e.g., Coulombic efficiency) can be measured as the total amount of charge provided by the device divided by the amount of charge that it takes to charge the device to full, which can be expressed as a fraction or percentage. A storage efficiency of energy device 100 can be, for example, approximately 60-80%, 65-75%, or the like. For comparison, commercial off-the shelf (COTS) battery products for household electronics can have an efficiency of approximately 95%, but have the drawback of having a rigid volume that is not suitable for wearable electronics (e.g., AA batteries).

Figure 5:
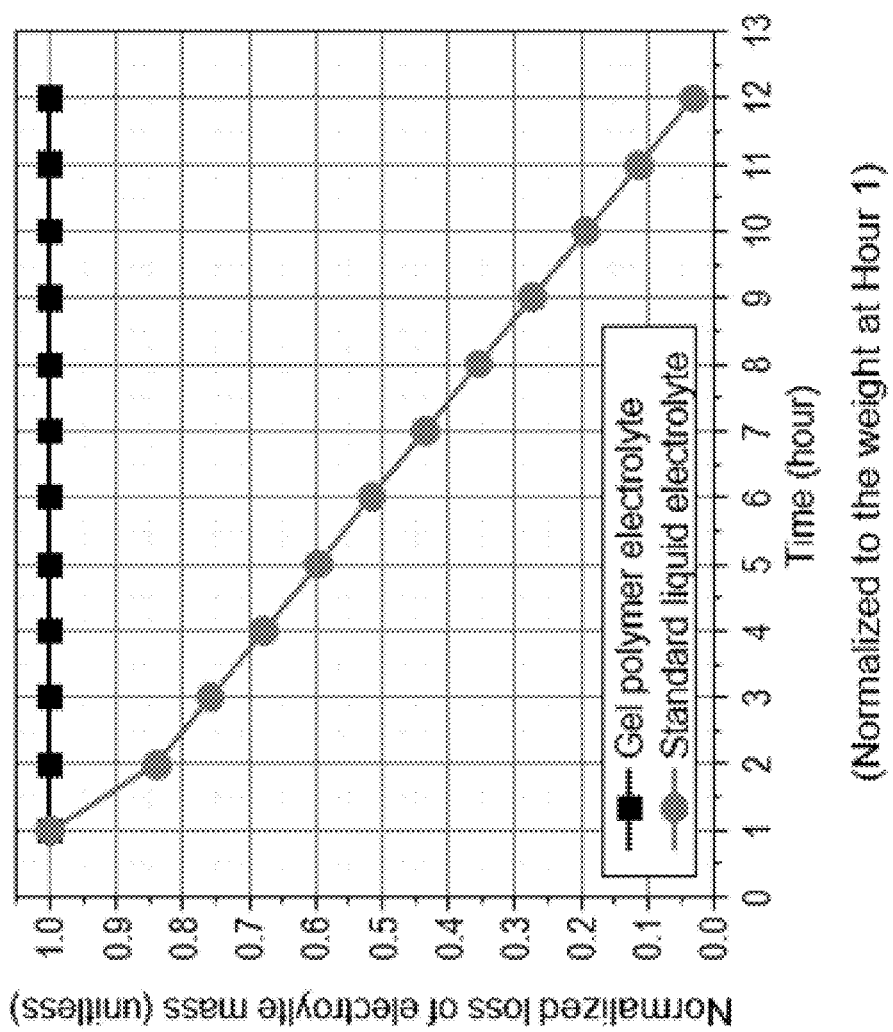
FIG. 5 shows a plot of measurement data of electrolyte loss over time of an energy storage device, according to some embodiments.

FIG. 5 shows a plot of actual measurement data of electrolyte loss over time of an energy storage device, according to some embodiments. Electrolyte retention is a property that affects product lifetime of the energy storage device. The graph plot in FIG. 5 compares two data sets, one set for a gel polymer electrolyte and one for a liquid electrolyte. The plot shows that the gel polymer electrolyte is able to maintain electrolyte mass with almost no change for at least 12 hours. That is, the gel polymer electrolyte can maintain approximately a constant electrolyte mass throughout a period of at least twelve hours. It is envisaged that the retention of the gel polymer electrolyte can be extrapolated out to weeks or months while still remaining usable. On the other hand, the liquid electrolyte suffers significant electrolyte loss, losing almost all of the electrolyte mass over the course of 12 hours.

In some embodiments, one or more of the compositions for the gel electrolyte can exhibit the electrolyte mass retention behavior shown in FIG. 5 (e.g., several compositions are incorporated by reference from U.S. application Ser. No. 17/583,881). As a non-limiting example, the particular energy storage device that was tested for generating the plot of FIG. 5 included a graphite cloth coated in LCO and LTO at loadings of 2.0 mAh/cm2 and 2.2 mAh/cm2 respectively. A ceramic-coated polyethylene (PE) layer separator was used to make the dry stack. The dry stack was then placed into a thermoplastic polyurethane (TPU) coated nylon pouch. The pouch was made by coating the inner sides of both nylon layers. The pouch was then sealed on 3 sides and allowed to dry under reduced pressure for 2 hrs at 100° C. Once dried, the pouch was filled with gel polymer electrolyte (GPE) (1.4 m LiTFSI+0.1 m LiDFOB in 1:3:5:1 EC:DMC:TEP:FEC, Polymer: 95:5 PEGDMA:PEGDA at 85% electrolyte, 15% polymer ratio). Shorthand definitions include ethylene carbonate (EC), dimethyl carbonate (DMC), triethyl phosphate (TEP), fluoroethylene carbonate (or 4-Fluoro-1,3-dioxolan-2-one) (FEC), poly(ethylene glycol)dimethacrylate (PEGDMA), and polyethylene glycol diacrylate (PEGDA). The particular variety of PEGDMA: PEGDA used in this non-limiting example was poly(ethylene glycol)dimethacrylate (700 mw): polyethylene glycol diacrylate (550 mw). Once filled, the final side of the pouch was heat-sealed and allowed to infiltrate under ambient conditions overnight. Once infiltrated the pouch was placed in an oven to cure at 80° C. for 3 hours. The cell was then tested at C/10 with no taper.

The liquid electrolyte used for generating FIG. 5 was a liquid electrolyte having 1.0 M LiPF6 (Lithium hexafluorophosphate), 3:7 EC:DMC. The fabrication of the energy storage device with the liquid electrolyte was substantially similar as described as above for the GPE, but with a different electrolyte composition and no curing step at the end.

In some embodiments, it is envisaged that the fiber-based fabrication method of power-generating fiber 202 can be extended to a textile design. By extending the concept to a larger area, the photovoltaic fiber can be modified to be a fabric comprising photovoltaic cells larger than the miniature versions photovoltaic cells 216, thereby providing more amperage. The wearable implementation can be achieved as described in reference to energy storage device 100 (FIG. 1), for example, by sowing or otherwise affixing the power-generating fabric onto wearable objects and/or providing electrical power to a wearable electronic device.

The steps of methods disclosed herein (e.g., fabrication methods) may be performed in any conceivable order and it is not required that all steps be performed. Moreover, the method steps described above merely reflect an example of steps based on the functions disclosed in embodiments herein. That is, the method is not limited to only those steps explicitly described. It should be appreciated that further method steps and functions are envisaged based on functions described in reference to embodiments herein.

It is to be understood that the phraseology or terminology herein is for the purpose of description and not of limitation, such that the terminology or phraseology of the present disclosure is to be interpreted by those skilled in relevant art(s) in light of the teachings herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While specific embodiments of the disclosure have been described above, it will be appreciated that embodiments of the present disclosure may be practiced otherwise than as described. The descriptions are intended to be illustrative, not limiting. Thus it will be apparent to one skilled in the art that modifications may be made to the disclosure as described without departing from the scope of the claims set out below.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein.

The breadth and scope of the protected subject matter should not be limited by any of the above-described exemplary embodiments, but should be defined only in accordance with the following claims and their equivalents.

What is claimed is:

1. A layered textile energy storage device comprising:
    first and second encasing layers each comprising a nylon fabric coated with a polyurethane;
    an anode comprising a carbon fabric coated with anode active material, carbon nanotubes, and a binder material;
    a cathode comprising a carbon fabric coated with cathode active material, carbon nanotubes, and a binder material; and
    a flexible separator layer disposed between the anode and cathode to prevent internal shorting of the layered textile energy storage device,
    wherein the anode, the cathode and the flexible separator layer are disposed between the first and the second encasing layers, and
    wherein a storage efficiency of the layered textile energy storage device is approximately 60-80% or 65-75%.

2. The layered textile energy storage device of claim 1, wherein the anode active material comprises lithium titanium oxide and the cathode active material comprises lithium cobalt oxide.

3. The layered textile energy storage device of claim 1, further comprising a polymer electrolyte disposed surrounding the anode, cathode, and flexible separator layers.

4. The layered textile energy storage device of claim 3, wherein the polymer electrolyte is a gel polymer electrolyte.

5. The layered textile energy storage device of claim 4, wherein the gel polymer electrolyte comprises a liquid precursor, a thermal initiator, and a polymer precursor.

6. The layered textile energy storage device of claim 5, wherein the liquid precursor comprises one or more aqueous or organic solvents and one or more lithium-based salts.

7. The layered textile energy storage device of claim 5, wherein the polymer precursor comprises:
    one or more monomers; or
    one or more crosslinkers.

8. The layered textile energy storage device of claim 1, wherein the coating of the anode or the coating of the cathode comprise 4% or more of the carbon nanotubes and 6% or more of the binder material.

9. The layered textile energy storage device of claim 1, wherein the binder material of the anode or the cathode comprises polyvinylidene fluoride material.

10. The layered textile energy storage device of claim 1, wherein the coating of the anode or the coating of the cathode have a thickness of approximately 1 millimeter or less.

11. The layered textile energy storage device of claim 1, wherein the layered textile energy storage device is configured to be affixed on a wearable object and provide electrical power to a wearable electronic device.

12. A layered textile energy storage device comprising:
    first and second encasing layers each comprising a nylon fabric coated with a polyurethane;
    an anode comprising a carbon fabric coated with anode active material, carbon nanotubes, and a binder material;
    a cathode comprising a carbon fabric coated with cathode active material, carbon nanotubes, and a binder material; and
    a flexible separator layer disposed between the anode and cathode to prevent internal shorting of the layered textile energy storage device, wherein the anode, the cathode and the flexible separator layer are disposed between the first and the second encasing layers, and
    wherein a storage capacity per weight of the layered textile energy storage device is approximately 60-120 mA h/g or 80-100 mA h/g.

13. The layered textile energy storage device of claim 12, wherein the layered textile energy storage device is configured to be affixed on a wearable object and provide electrical power to a wearable electronic device.

14. The layered textile energy storage device of claim 12, wherein the anode active material comprises lithium titanium oxide and the cathode active material comprises lithium cobalt oxide.

15. The layered textile energy storage device of claim 12, further comprising a polymer electrolyte disposed surrounding the anode, cathode, and flexible separator layers.

16. The layered textile energy storage device of claim 15, wherein the polymer electrolyte is a gel polymer electrolyte.

17. The layered textile energy storage device of claim 16, wherein the gel polymer electrolyte comprises a liquid precursor, a thermal initiator, and a polymer precursor.

18. The layered textile energy storage device of claim 12, wherein the binder material of the anode or the cathode comprises polyvinylidene fluoride material.

19. A layered textile energy storage device comprising:
 first and second encasing layers each comprising a nylon fabric coated with a polyurethane;
 an anode comprising a carbon fabric coated with anode active material, carbon nanotubes, and a binder material;
 a cathode comprising a carbon fabric coated with cathode active material, carbon nanotubes, and a binder material;
 a flexible separator layer disposed between the anode and cathode to prevent internal shorting of the layered textile energy storage device, wherein the anode, the cathode and the flexible separator layer are disposed between the first and the second encasing layers; and
 a gel polymer electrolyte disposed surrounding the anode, cathode, and flexible separator layers, wherein the gel polymer electrolyte is configured to maintain approximately a constant electrolyte mass throughout a period of at least twelve hours.

20. The layered textile energy storage device of claim 19, wherein the layered textile energy storage device is configured to be affixed on a wearable object and provide electrical power to a wearable electronic device.

21. The layered textile energy storage device of claim 19, wherein the coating of the anode or the coating of the cathode have a thickness of approximately 1 millimeter or less.

* * * * *